United States Patent [19]

Nee

[11] Patent Number: 5,120,381
[45] Date of Patent: Jun. 9, 1992

[54] METHOD OF FORMING A PROTECTIVE COATING ON METALLIC PIPE

[75] Inventor: Robert M. Nee, Houston, Tex.

[73] Assignee: Polyguard Products Incorporated, Ennis, Tex.

[21] Appl. No.: 576,965

[22] Filed: Sep. 4, 1990

Related U.S. Application Data

[62] Division of Ser. No. 413,129, Sep. 27, 1989, Pat. No. 4,983,449.

[51] Int. Cl.[5] .............................................. B29C 63/10
[52] U.S. Cl. ........................... 156/187; 156/195; 156/337
[58] Field of Search ............... 156/187, 195, 337, 229; 138/144, 150, 154, 172, 178, DIG. 2, DIG. 6, 145, 174

[56] References Cited

U.S. PATENT DOCUMENTS

| | | | |
|---|---|---|---|
| 30,889 | 3/1882 | McNulty | 138/144 |
| 1,867,984 | 7/1932 | Pistor | 138/145 |
| 2,650,619 | 9/1953 | Pflaumer | 138/144 |
| 2,828,798 | 4/1958 | Hopkins et al. | 156/187 |
| 3,388,723 | 6/1968 | McNulty | 156/195 |
| 4,192,697 | 3/1980 | Parker et al. | 156/195 |

FOREIGN PATENT DOCUMENTS

| | | | |
|---|---|---|---|
| 0631743 | 11/1978 | U.S.S.R. | 156/187 |
| 1085267 | 9/1967 | United Kingdom | 156/187 |

*Primary Examiner*—Michael W. Ball
*Assistant Examiner*—Steven D. Maki
*Attorney, Agent, or Firm*—Jack A. Kanz

[57] ABSTRACT

A continuous strip non-shielding and pressure-resistant wrapping material for protecting buried metallic pipe is disclosed. The wrapping material comprises a continuous layer of cold-flowable rubberized bitumen bonded to a substantially non-elastic porous support backing with a release film positioned on the exposed face of the bitumen to protect the bitumen prior to application. When applied to a metallic pipe, the protective bitumen is secured to and held in place by the non-elastic support backing and thus cannot sag away from the pipe. The porous support backing provides potential electric current paths through each pore so that cathodic protection can be effectively utilized to protect against corrosion in even the smallest holiday in the bitumen layer.

8 Claims, 1 Drawing Sheet

METHOD OF FORMING A PROTECTIVE COATING ON METALLIC PIPE

This application is a division of application Ser. No. 07/413,129 filed Sep. 27, 1989 entitled Protective Wrapping Material now U.S. Pat. No. 4,983,449.

This invention relates to protective wrapping materials. More particularly, it relates to protective wrapping materials which form non-sag, non-shielding puncture-resistant protective coatings with improved thermal and application characteristics for use on buried metallic pipe and the like and to methods of making and using same.

Protection of buried metallic pipe from corrosion is a problem which has been approached and partially resolved in many ways. Conventionally, metallic pipe may be coated with any of a variety of materials such as fusion-bonded epoxy resin, hot-applied coal tar or asphalt, extruded polyethylene, glass cloth, asbestos felt and cold-applied plastic tapes. Sometimes combinations of protective coatings are applied and often cathodic protection is used wherein an electric current is applied to prevent corrosion where defects or holidays exist in the coating. All conventional coatings have certain advantages but all suffer from inherent disadvantages.

Protective wrappings for buried pipe are basically classified as either hot-applied or cold-applied. Hot-applied wrappings must be heated immediately prior to application in order to cause the protective coating material to flow sufficiently to adhere to the pipe and form a waterproof seal between over-lapped edges of spirally wrapped coatings. Hot-applied coatings are, of course, difficult to apply and require special heating apparatus to properly heat the coating prior to application. Thus hot-applied coatings tend to be somewhat difficult and more expensive to apply, particularly on small projects Hot-applied coatings also generally require an outer protective backing such as felt or a polyethylene film or the like applied in a second operation to provide mechanical protection for the hot-applied coating.

Cold-applied coatings are usually much easier to apply. The protective coating is usually a cold-flowable rubberized bitumen or the like which is laminated to and carried on a support backing film. These support films usually possess a characteristic known as memory or elasticity. When stretched under tension, the elastic characteristic causes the stretched film to tend to return to its original shape when tension is released. The coating is applied by stretching the support backing under tension as the coating is spirally wrapped on the pipe to squeeze the bitumen layer and form a seal between the bitumen and the pipe as well as between the bitumen and the back side of the support backing at the over-lapped edges. Prior cold-applied coatings include an elastic support backing such as a polyethylene film or the like. Because of the elastic characteristics such elastic support backings are advantageous in applying the coating around an irregular surface such as a valve, a T or the like.

While elastic material is satisfactory for some uses as a support backing in applying cold-flowable bitumens and the like, it suffers from several distinct disadvantages. Since the support backing is elastic, care must be taken to avoid over-stretching the wrapping material during application. If too much tension is applied to the wrapping strip, a condition known as "neck down" occurs wherein the width of the strip decreases as the length increases. Thus, instead of overlapping the edges as the strip is applied to the pipe, narrow spirals of pipe surface will be exposed between the spirals of wrapping. Furthermore, excessive stretching reduces the thickness of protective bitumen layer applied and may cause undesirable wrinkles in the coating. The elastic characteristic of such films can also be detrimental after the film is stretched during application if the film is damaged by backfill while covering the coated pipe. For example, if a rock or other object tears a stretched film, tension will be relieved and the film will draw away from the area of the tear to expose pipe surface to the corrosive environment.

Since the backing material is elastic, it normally tends to sag and permit the coating to pull away from the lower sides of the pipe when the coated pipe is buried. Sagging results from the natural effects of gravity and is more often induced by a condition known as "soil stress" wherein the backfill material used to cover the buried pipe is compressed around the pipe and pulls the coating from the pipe. Heating the coating, as by flowing hot fluids through the wrapped conduit, can also cause elastic films to stretch and sag or creep away from the surface of the pipe. Because of the low thermal stability of conventional elastic films, such sagging can form large and seriously deleterious voids between the wrapped coating and the pipe walls leaving the pipe exposed to water and corrosion.

Use of a continuous non-porous film as a backing support also inhibits cathodic protection of voids (sometimes called holidays) in the protective coating. In order for cathodic protection to effectively protect exposed metal, substantially all the exposed metal surface area must be in electrical contact with the surrounding earth to be accessible to the protective effect of an electrical current. However, if holidays form in the bitumen between the pipe and a non-porous support backing, the holiday is effectively isolated from the surrounding earth by the support backing but still may collect water or other corrosive fluids by migration from other interconnected voids. Accordingly, if a holiday occurs in the bitumen between the film and the pipe surface, the support backing will totally shield the pipe surface from the effects of cathodic protection. Similarly, if there is an opening in the film covering a holiday but the holiday in the bitumen is larger than the opening in the film, the electric current path will be restricted to an area substantially equivalent to the size of the opening in the film. For example, if a sag occurs as a result of backfill or soil stress on a buried pipe, a holiday can occur in non-porous film where the bitumen is damaged or displaced from the film surface. However, the surface area of exposed pipe is usually much larger than the opening in the film. Water (and thus electrical current) can enter the opening in the film to permit water to fill the void between the pipe surface and the coating. However, electrical current will follow the path of least resistance to the conductive metal. Thus, if the opening in the film is small the amount of pipe surface subjected to cathodic protection will be limited to an area substantially equal to the size of the opening which is closest to the pipe. The remainder of exposed pipe surface will be subject to corrosion since it is not subject to cathodic protection. As used herein the term "non-shielding" means failing to form an electrical shield against cathodic protection as ordinarily understood by those skilled in the art.

In accordance with the present invention a non-sag, non-shielding protective wrapping is formed by securing a layer of cold-flowable rubberized bitumen or the like on at least one surface of a substantially non-elastic porous support backing. The exposed surface of the rubberized bitumen may be protected prior to application to a pipe surface by a removable non-adherent sheet liner so that long strips of wrapping can be coiled into rolls for shipping, handling and convenient use in application to the pipe. Since the support backing is non-elastic, the present invention overcomes the sagging and memory problems associated with elastic support backings. Since the support backing is porous, it avoids cathodic shielding problems associated with non-porous support backings.

Other features and advantages will become more readily understood from the following detailed description taken in connection with the appended claims and attached drawing in which:

Figure 1:
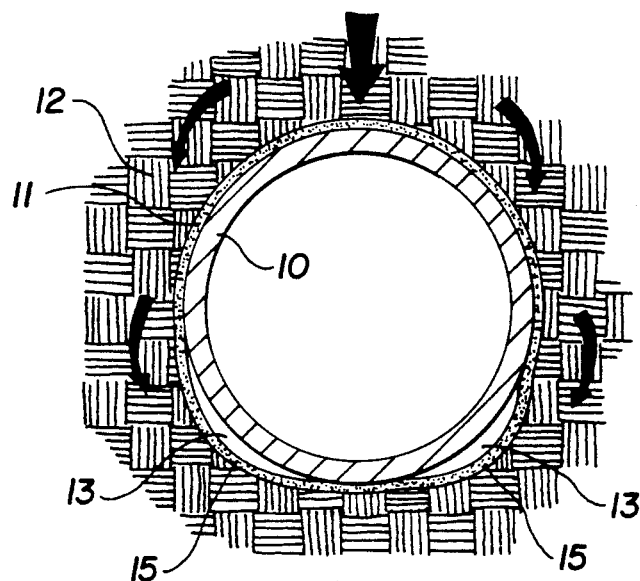
FIG. 1 is a cross-sectional view of a buried conduit wrapped with conventional elastic-backed wrapping illustrating the sag problem associated therewith.

The problems typically associated with prior art wrapping are illustrated in FIGS. 1–3A. The metal pipe 10 has been wrapped with a conventional protective coating material 11 supported on an elastic support backing 15. The wrapped pipe is then buried in the earth and covered with backfill material 12. Note that as backfill material 12 is packed around the coated pipe, the coating 11 on the lower surfaces of the pipe is pushed downward (as illustrated by the arrows) by the backfill material 12 as well as by the natural effects of gravity. Since the support backing 15 is elastic, the coating 11 tends to sag away from the pipe 10 forming voids 13. Similar effects are caused by backfill settlement and soil shifting after the pipe has been covered a substantial length of time.

The voids 13 may vary from large to small. However, any pipe surface adjacent a void is exposed to the corrosive effects of materials such as water and the like which may enter the void. Furthermore, if the support backing is elastic, it merely stretches to form a void without being punctured. As illustrated in FIG. 1, the void 13 is isolated from the surrounding backfill 12 by the support backing film 15. Where the support backing film is a continuous plastic film such as polyethylene, the film acts as a dielectric insulating shield.

Figure 2:
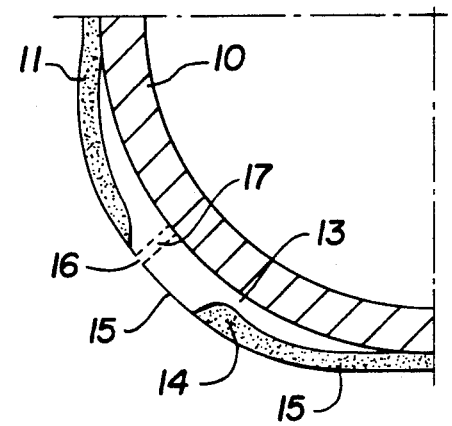
FIG. 2 is an enlarged cross-sectional view of a partial section of buried pipe illustrating shielding problems associated with voids formed in the wrapping.

As illustrated in FIG. 2, cathodic protection relies on direct paths of electrical communication between the exposed pipe surface and the surrounding earth. If a perforation 16 which is sufficient to permit the passage of water is formed in the support backing 15 adjacent a void 13, an electrically conductive path (illustrated by dashed lines 17) is formed and cathodic protection will be effective. However, as illustrated in FIG. 2 the electric current follows the path of least resistance and the cathodic protection will be confined to substantially the surface area of the pipe defined by the direct electrical path, leaving the remainder of the pipe surface exposed by the void 13 subject to corrosion. If the film 15 is not perforated the film forms a complete shield and barrier to the effects of cathodic protection and the surface of the pipe adjacent the void cannot be protected. FIG. 2 also illustrates a condition which occurs when the force applied by the backfill is sufficient to squeeze the wrapping material 11 and displace part 14 of the bitumen 11 between the pipe and the support backing 15. When this occurs part of the void is covered only by the support backing which forms a shield against cathodic protection.

Figure 4:
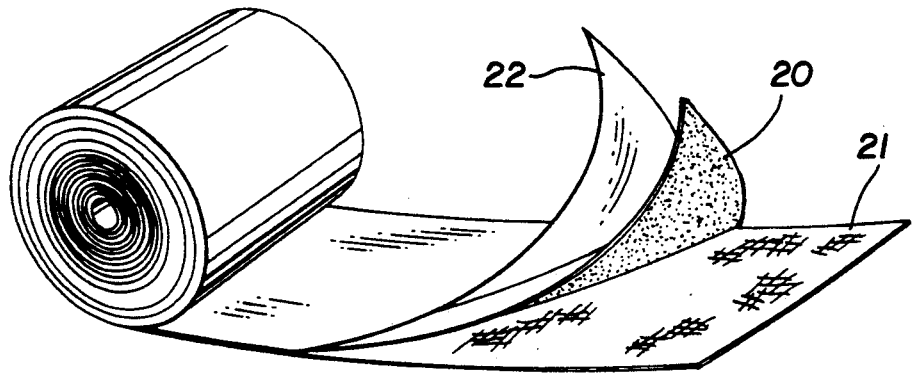
FIG. 4 is a partially exploded illustration of the wrapping structure of the present invention.

The arrangement of components of the wrapping material of the present invention is illustrated in FIG. 4. A layer of cold-flowable rubberized bitumen 20 is laminated onto one surface of a substantially non-elastic porous support backing 21. Various compositions of cold-flowable rubberized bitumen or similar material may used for the protective layer 20. Such compositions are well known in the art. Conventionally, such materials are supported on a continuous elastic film of polyethylene or the like. However, in accordance with the invention a woven non-elastic support backing is used. In the preferred embodiment the support backing is a basket weave fabric formed of essentially flat thermoplastic fibers and has a porosity defined in terms of open surface area of about one percent (1%) or less but not more than about twenty percent (20%). A material suitable for the support backing is disclosed and fully described in U.S. Pat. No. Re. 30,889 to Frank E. McNulty, the disclosure which is incorporated herein by reference. Since the support backing is formed of thermoplastic material such as polypropylene, it is not only substantially non-elastic, it is much more temperature stable and thus will not stretch or sag when subjected to heat. Flat thermoplastic fibers (sometimes referred to as slit films) of polypropylene are particularly effective because of the thermal stability and non-elasticity of polypropylene. This material is most preferred because it can be woven into a fabric which is porous with respect to water but exhibits essentially zero percent (0%) open surface area. The flat fibers formed into a basket weave fabric also exhibit high resistance to mechanical damage from punctures, abrasions and the like. The essential characteristics of the support backing material 21 are that it be porous and substantially non-elastic. The porosity, however, should be in the form of openings which are large enough to permit the passage of water but small enough to substantially prevent the flow of bitumen therethrough during lamination of the bitumen layer 20 onto the support backing 21. A tightly close-woven fabric is most preferred wherein essentially no direct open path exists from surface to surface. Instead, porosity results by virtue of deviated and contorted paths between the woven fibers, particularly along the lateral edges of the woven flat fibers. Such paths are suitable to permit the passage of air and water (and thus electrical current) but, because of the viscosity and higher surface tension of bitumens, prevent the flow of bitumens therethrough under the pressures and temperatures at which the bitumen layer 20 is laminated onto the support backing 21. In the preferred embodiment, the material used for support backing 21 is flat strips of polypropylene of sufficient density to be substantially non-elastic woven into a fabric having an open surface area of about one percent (1%) or less. Even though the open surface area is one percent or less, sufficient porosity exists to permit water to readily pass therethrough. However, because of the high surface tension of rubberized bitumen, the bitumen does not readily pass through the small interstices of the weave. Thus the amount of bitumen forced through the weave during lamination of the bitumen layer 20 onto the support backing 21 will be so small that a release sheet will not ordinarily be required to separate the wrapping layers when rolled. However, if a larger open surface area support backing is used, larger amounts of bitumen will squeeze through the support backing 21. When the open area approaches twenty percent (20%) sufficient bitumen may pass through the pores to require the use of double-sided release materials.

Because of the rough surface of woven material (as compared to continuous films) it is easier to laminate bitumens thereto. Under the pressures and temperatures used in the lamination process, bitumen is forced into the interstices of the weave and thus forms a strongly adherent bond to the support backing. Similarly, it is easier to obtain good adhesion between the overlapped edges when the wrapping strip is applied to pipe.

For forming protective wrapping materials for a metal pipe, the rubberized bitumen layer 20 may be formed with desired thickness and laminated to the support backing 21 by conventional techniques. The thickness of the bitumen material in the preferred embodiment is approximately 0.040 inch but may be as thin as 0.010 inch or less or as thick as 0.060 inch or more, depending upon the intended application. Of course, the thickness of the sealing material 20 may vary widely depending on such factors as composition and intended use.

Since the wrapping material is ordinarily to be applied by spiral wrapping around a pipe, the laminate of support backing and bitumen material is ordinarily formed in continuous sheets which are then cut into strips of desired width. The strips are then coiled into rolls for transport, handling and application. In order to prevent the bitumen from adhering to the back side of the support backing when rolled, the exposed surface of the bitumen may be covered with a release material such as a thin sheet 22 of mylar or other non-porous release sheet or film which does not adhere to the bitumen. Various suitable release materials are well known in the art. As the strip is unwound from the roll for use, the release sheet 22 is stripped from the top surface and the exposed surface of the bitumen applied directly to the surface of the pipe. Of course, some compositions of rubberized bitumen and other materials suitable for use as the sealing layer 20 are not sufficiently tacky to bond to the back side of the support backing 21 under the pressures encountered in rolling the strips. In such cases the release sheet 22 may be eliminated.

It will be recognized that a primer is preferably applied to the surface of the pipe immediately prior to application of bitumen to aid adhesion of the bitumen to pipe. Conventional primers which contain solvents or softeners for the bitumen are well known in the art and are applicable in using the wrapping material of the present invention.

Figure 3A:
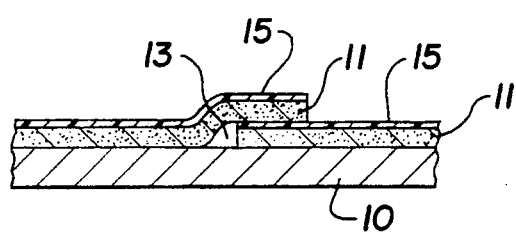
FIG. 3A is a longitudinal cross-sectional view of a section of wrapped pipe illustrating void problems associated with prior art wrapping materials.
Figure 3B:
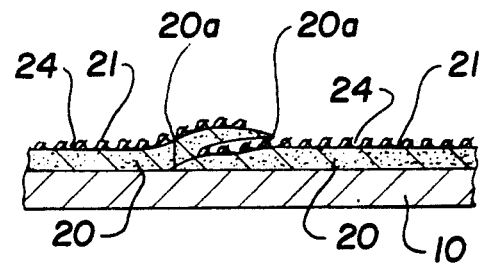
FIG. 3B is a longitudinal cross-sectional view of a section of pipe wrapped with the protective wrapping material of the invention.

The use of a porous non-elastic backing support provides several unique advantages. For example, when the wrapping strip is applied spirally about a pipe, the edges of the wrapping material are overlapped to form a continuous coating. Thus one edge portion of the exposed surface of the bitumen layer is overlapped and applied to the backside of the preceding layer. When using conventional elastic support backing, incomplete coating of the pipe in the overlapped areas sometimes occurs if insufficient tension (thus insufficient pressure) is applied during application to squeeze the overlapped edges. As illustrated in FIG. 3A, a spiral void 13 may be formed at the edge of the first wrapping between the pipe surface and the overlapped wrapping unless the wrapping is applied with sufficient pressure to distort the bitumen layer 11 adjacent the edges. However, since the support backing 21 of the present invention (see FIG. 3B) is substantially non-elastic, higher tension may be applied and the bitumen layer 20 (instead of the support backing) is distorted. Thus part 20a of the bitumen layer 20 is squeezed laterally from the wrapping strip to completely fill the void and ensure that a continuous layer of bitumen is applied to the pipe.

The wrapping material is, of course, applied under tension. Therefore, as the bitumen is applied to the backside of the preceding support backing material, bitumen is squeezed through the interstices 24 of the support backing material to form a bitumen-to-bitumen seal. This assures a complete and thorough seal over the entire length of the coated pipe. Furthermore, since the support backing material is non-elastic, the bitumen material is held firmly adjacent the surface of pipe. When the pipe is covered with backfill material, the backfill cannot stretch the support backing and the wrapping layer cannot sag from the pipe. Instead, the bitumen remains tightly secured to all surfaces of the pipe by the tension maintained on the support backing material. Most importantly, since the support backing material is a woven fabric, small pores are available at the interstices 24 therein throughout its entire surface. If a holiday is formed within the bitumen, a water path (therefore a conductive path) between the holiday and the surrounding earth is directly available for even the most minute holiday. Thus electric current can pass from the pipe through any such holiday to the surrounding earth to effect cathodic protection of any surface of the pipe exposed by such holiday.

It will be readily appreciated that the wrapping product of the invention may be applied by the same techniques as are commonly used in applying other cold-applied protective wrapping materials. Thus the wrapping material of the invention enjoys all of the advantages of simplicity of application commonly associated with cold-applied wrapping material. However, since the support backing is substantially non-elastic, greater tension may be used in applying the wrap to obtain better adhesion between the bitumen and the pipe and better sealing between the overlapped edges without fear of over-stretching the support backing and producing a stretched film with undesirable memory. Furthermore, the wrapping material of the invention avoids the sagging problems commonly associated with elastic support backing materials used in conventional cold-applied wrapping materials.

The non-elastic and porous characteristics of the support backing provide additional advantages in application of the wrapping material to the pipe. As noted above, great care must be used in applying conventional wrappings to avoid over-stretching and thus necking down of the support backing. Since the support backing of the present invention is substantially non-elastic, greater tension may be applied without fear of necking down. Greater tension not only assures complete fill adjacent the overlapped edges, it aids in prevention of forming trapped air bubbles between the pipe surface and the bitumen layer 20 during application. If insufficient tension is applied, the wrapping may not be uniformly applied on the pipe surface and air bubbles become entrapped adjacent the pipe surface. When non-porous support backings are used, such air bubbles are permanently entrapped. However, air trapped between the bitumen and the pipe will eventually migrate through the bitumen and escape through a porous support backing where a sufficient pressure differential exists. Since the support backing of the present invention permits greater tension to be applied, air bubble formation is substantially eliminated. Furthermore, any such air bubbles formed are entrapped under pressure as a result of the greater tension applied to the support backing during application to the pipe. Thus any such trapped air will tend to migrate through the bitumen and escape through the porous support backing.

Not only may greater tension be applied in wrapping the pipe with non-elastic support backing, since the support backing has greater thermal stability the wrapped coating will withstand higher temperatures without stretching and sagging. Use of a porous support backing also provides the unique advantage of avoiding cathodic shielding of any holidays formed in the sealing material.

While the invention has been described with reference to a particular woven support backing in combination with rubberized bitumen, it will be readily recognized that other support backings of similar characteristics as well as other adhesive materials capable of being cold-applied are similarly suitable for practicing the invention. It is to be understood, therefore, that although the invention has been described with particular reference to specific embodiments thereof, the forms of the invention shown and described in detail are to be taken as preferred embodiments of same, and that various changes and modifications may be resorted to without departing from the spirit and scope of the invention as defined by the appended claims.

What is claimed is:

1. The method of forming a continuous, non-sag, non-shielding protective coating on metallic pipe comprising the steps of:
    (a) forming a laminate comprising a continuous layer or bitumen on a continuous strip of substantially non-elastic porous support backing of basket weave fabric formed of essentially flat thermoplastic fibers having an open surface area of about one percent to about twenty percent;
    (b) applying the bitumen to the surface of said pipe by spirally wrapping the laminate around the pipe so that the edges of the laminate overlap; and
    (c) applying sufficient tension to the laminate during the wrapping procedure to extrude bitumen through the pores of the support backing in the overlapped areas and form a bitumen-to-bitumen seal between the overlapped layers.

2. The method set forth in claim 1 including the step of applying a primer to the surface of said prior to applying the bitumen thereto.

3. The method set forth in claim 1 including the step of heating the bitumen surface of said laminate immediately prior to applying the bitumen to the surface of said pipe.

4. The method of forming a continuous, non-sag, non-shielding protective coating on metallic pipe comprising the steps of:
    (a) forming a laminate comprising a continuous layer of sealing material on a continuous strip of substantially non-elastic porous support backing of basket weave fabric formed of essentially flat thermoplastic fibers having an open surface area of about one percent to about twenty percent;
    (b) applying the sealing material to the surface of said pipe by spirally wrapping the laminate around the pipe so that the edges of the laminate overlap; and
    (c) applying sufficient tension to the laminate during the wrapping procedure to extrude sealing material through the pores of the support backing in the overlapped areas and form a sealing material to sealing material bond between the overlapped layers.

5. The method of claim 4 including the step of applying a primer to the surface of said pipe prior to applying the sealing material thereto.

6. The method of claim 4 including the step of heating the sealing material surface immediately prior to applying the sealing material to the surface of said pipe.

7. The method of forming a continuous, non-sag, non-shielding protective coating on metallic pipe comprising the steps of:
    (a) forming a laminate comprising a continuous layer of cold-flowable rubberized bitumen on a continuous strip of substantially non-elastic porous support backing of basket weave fabric formed of essentially flat thermoplastic fibers having an open surface area of about one percent to about twenty percent;
    (b) applying the rubberized bitumen to the surface of said pipe by spirally wrapping the laminate around the pipe so that the edges of the laminate overlap; and
    (c) applying sufficient tension to the laminate during the wrapping procedure to extrude bitumen through the pores of the support backing in the overlapped areas and form a bitumen-to-bitumen seal between the overlapped layers.

8. The method of forming a continuous, non-sag, non-shielding protective coating on metallic pipe comprising the steps of:
    (a) forming a laminate comprising a continuous layer of cold-flowable rubberized bitumen on a continuous strip of substantially non-elastic porous support backing of basket weave fabric formed of essentially flat thermoplastic fibers having an open surface area of about one percent to about twenty percent;
    (b) applying a primer to the surface of a metallic pipe;
    (c) applying the rubberized bitumen to the surface of said pipe by spirally wrapping the laminate around the pipe so that the edges of the laminate overlap; and
    (d) applying sufficient tension to the laminate during the wrapping procedure to extrude bitumen through the pores of the support backing in the overlapped areas and form a bitumen-to-bitumen seal between the overlapped layers.

* * * * *

UNITED STATES PATENT AND TRADEMARK OFFICE
CERTIFICATE OF CORRECTION

PATENT NO. : 5,120,381
DATED : June 9, 1992
INVENTOR(S) : Robert M. Nee

It is certified that error appears in the above-indentified patent and that said Letters Patent is hereby corrected as shown below:

Column 7, line 2, claim 2, after "said" insert --pipe--.

Signed and Sealed this

Fourteenth Day of September, 1993

Attest:

BRUCE LEHMAN

*Attesting Officer*     *Commissioner of Patents and Trademarks*

REEXAMINATION CERTIFICATE (2793th)

United States Patent [19]

Nee

[11] B1 5,120,381

[45] Certificate Issued Feb. 6, 1996

[54] METHOD OF FORMING A PROTECTIVE COATING ON METALLIC PIPE

[75] Inventor: Robert M. Nee, Houston, Tex.

[73] Assignee: Polyguard Products Incorporated, Ennis, Tex.

Reexamination Request:
No. 90/003,840, May 23, 1995

Reexamination Certificate for:
Patent No.: 5,120,381
Issued: Jun. 9, 1992
Appl. No.: 576,965
Filed: Sep. 4, 1990

Certificate of Correction issued Sep. 14, 1993.

Related U.S. Application Data

[62] Division of Ser. No. 413,129, Sep. 27, 1989, Pat. No. 4,983,449.

[51] Int. Cl.⁶ ................................................. B29C 63/10
[52] U.S. Cl. ........................... 156/187; 156/195; 156/337
[58] Field of Search .................................. 156/187, 195, 156/229, 337; 138/144, 145, 150, 154, 172, 174, 178, DIG. 2, DIG. 6

[56] References Cited

U.S. PATENT DOCUMENTS

| | | | |
|---|---|---|---|
| Re. 30,889 | 3/1982 | McNulty | 138/144 |
| 1,867,984 | 7/1932 | Pistor | 138/145 |
| 2,650,619 | 9/1953 | Pfaumer | 138/144 |
| 2,828,798 | 4/1958 | Hopkins et al. | 156/187 |
| 3,388,723 | 6/1968 | McNulty | 156/195 |
| 3,470,057 | 9/1969 | Stuart et al. | 156/392 |
| 3,547,731 | 12/1970 | Stuart et al. | 156/392 |
| 4,113,545 | 9/1978 | Stuart et al. | 156/392 |
| 4,125,422 | 11/1978 | Stuart et al. | 156/394 |
| 4,192,697 | 3/1980 | Parker et al. | 156/195 |

FOREIGN PATENT DOCUMENTS

| | | | |
|---|---|---|---|
| 0631743 | 11/1978 | U.S.S.R. | 156/187 |
| 1085267 | 9/1967 | United Kingdom | 156/187 |

OTHER PUBLICATIONS

Literature relating to Stuart Steel Protection Corporation published before Sep. 27, 1988. including "Stuart Wrap and Wrapster® Application Specifications"; Stuart Wrap & Wrapster® Operating Instructions Model AS6; Manual Application Specifications for Stuart Super Wrap; Stuart Product Data=Stuart Super Wrap and Stuart Primer; and Stuart Hot Wrapster® wrapping Stuart Wrap.

*Primary Examiner*—Steven D. Maki

[57] ABSTRACT

A continuous strip non-shielding and pressure-resistant wrapping material for protecting buried metallic pipe is disclosed. The wrapping material comprises a continuous layer of cold-flowable rubberized bitumen bonded to a substantially non-elastic porous support backing with a release film positioned on the exposed face of the bitumen to protect the bitumen prior to application. When applied to a metallic pipe, the protective bitumen is secured to and held in place by the non-elastic support backing and thus cannot sag away from the pipe. The porous support backing provides potential electric current paths through each pore so that cathodic protection can be effectively utilized to protect against corrosion in even the smallest holiday in the bitumen layer.

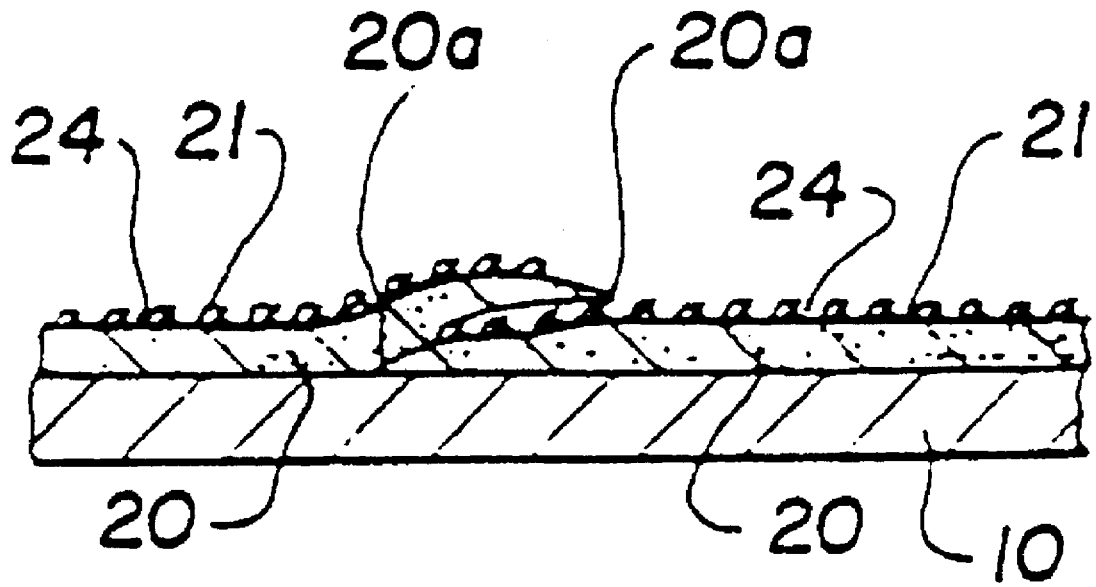

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–8 is confirmed.

* * * * *